(12) United States Patent
Robinson et al.

(10) Patent No.: US 7,752,254 B2
(45) Date of Patent: Jul. 6, 2010

(54) PROPAGATING CONTEXTS BETWEEN A FIRST AND SECOND SYSTEM

(75) Inventors: Ian Robinson, Southampton (GB); Andrew Wilkinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 11/738,000

(22) Filed: Apr. 20, 2007

(65) Prior Publication Data

US 2008/0040398 A1   Feb. 14, 2008

(30) Foreign Application Priority Data

Apr. 29, 2006   (GB) .................................. 0608580.7

(51) Int. Cl.
*G06F 15/16* (2006.01)
(52) U.S. Cl. ..................... 709/201; 709/203; 709/204; 709/244; 718/101; 370/352
(58) Field of Classification Search ................ 709/203, 709/204, 244; 707/201; 370/352; 718/101
See application file for complete search history.

(56) References Cited

U.S. PATENT DOCUMENTS

| | | | |
|---|---|---|---|
| 2004/0019512 A1* | 1/2004 | Nonaka ........................... 705/8 |
| 2004/0123293 A1* | 6/2004 | Johnson ........................ 718/101 |
| 2004/0193681 A1* | 9/2004 | Koike et al. ................... 709/203 |
| 2007/0220420 A1* | 9/2007 | Sanders ........................ 715/513 |

* cited by examiner

*Primary Examiner*—Wing F Chan
*Assistant Examiner*—Hitesh Patel
(74) *Attorney, Agent, or Firm*—Marcia L. Doubet (57) ABSTRACT

Contexts are propagated between a first and second system. The contexts provide information about the environment within which work in the first and second systems is to be performed. The contexts have a hierarchical structure in which the bottom most context in the hierarchy is identified as a leaf context. A request is received at the first system to perform work. Context information is created in the first system pertaining to the environment within which the work is to be performed. The context information forms a context hierarchy having a root context and one or more descendant contexts. Information is propagated from the first system to the second system enabling re-creation at the second system of context information pertaining to the leaf context only.

20 Claims, 9 Drawing Sheets

Superior Environment 10

PROPAGATING CONTEXTS BETWEEN A FIRST AND SECOND SYSTEM

FIELD OF THE INVENTION

The invention relates to the distribution of contextual information and more particularly to the distribution of nested contexts.

BACKGROUND OF THE INVENTION

Context information is typically used to encapsulate and describe the state of a particular aspect of a data processing system. For example, a transaction context describes an associated transaction that is currently in existence on the system. Such a transaction may have one or more descendants, in which case nested contexts would be used to describe the hierarchy of transactions.

The concept of nested contexts and distributing them between systems is not new, for example, an OMG Transaction Service (OTS) specification, currently available from Object Management Group, describes nested transactions and their propagation between processes. In the case of OTS, however, details of the entire hierarchy are propagated between systems.

Figure 1A:
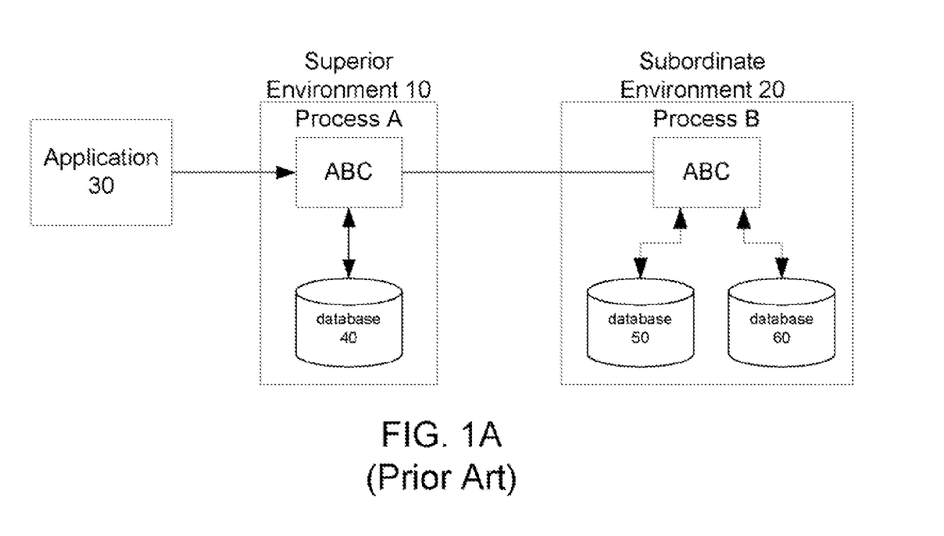
FIGS. 1A, 1B, 2A and 2B disclose prior art techniques for the use of context information.
Figure 1B:
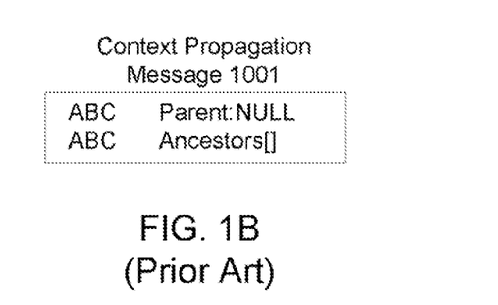

The use of context information in transaction processing will be used for explanatory purposes. FIGS. 1A and 1B illustrate the prior art process in detail.

Referring first to FIG. 1A, an application 30 may initiate a transaction (such as to book a vacation) in a "superior" (or coordinating) environment 10. The term "environment" should be construed as encompassing both hardware in a data processing or computer system and software that must be installed and executed on that system in order to perform a described transaction. When a transaction is instantiated by process A, context information is created about that transaction. This information typically consists of a transaction identifier (e.g. ABC). Transaction ABC may require interaction with a backend resource such as a database 40. Again context information is created indicating that this is the case. Furthermore, the transaction ABC may need to instantiate work on another distributed system. If this is the case, then the context information needs to be propagated to the secondary or subordinate environment 20.

Propagation of the context information is achieved via a Context Propagation Message (CPM) 1001 shown in FIG. 1B. A context propagation message includes details of the transaction(s) owned by superior environment 10. Thus the CPM message 1001 includes the transaction identifier ABC, details of its parent (NULL in this case) and details of its ancestors or children (again NULL).

Upon receiving CPM 1001 in subordinate environment 20, process B extracts information from the message to recreate the context hierarchy present in superior environment 10. Again, subordinate transaction ABC may require interaction with backend systems such as databases 50, 60.

Superior transaction ABC has overall control. When application 30 indicates that the transaction is to complete, superior transaction ABC commits (completes) its changes to backend database 40 and also instructs subordinate transaction ABC to complete its part of the work. Responsive to an instruction to complete successfully (henceforth known as a complete instruction) from superior ABC, subordinate transaction ABC commits its changes to databases 50, 60.

It can be seen that the processing involved when there is a parent transaction only (no children) is relatively simple.

Figure 2A:
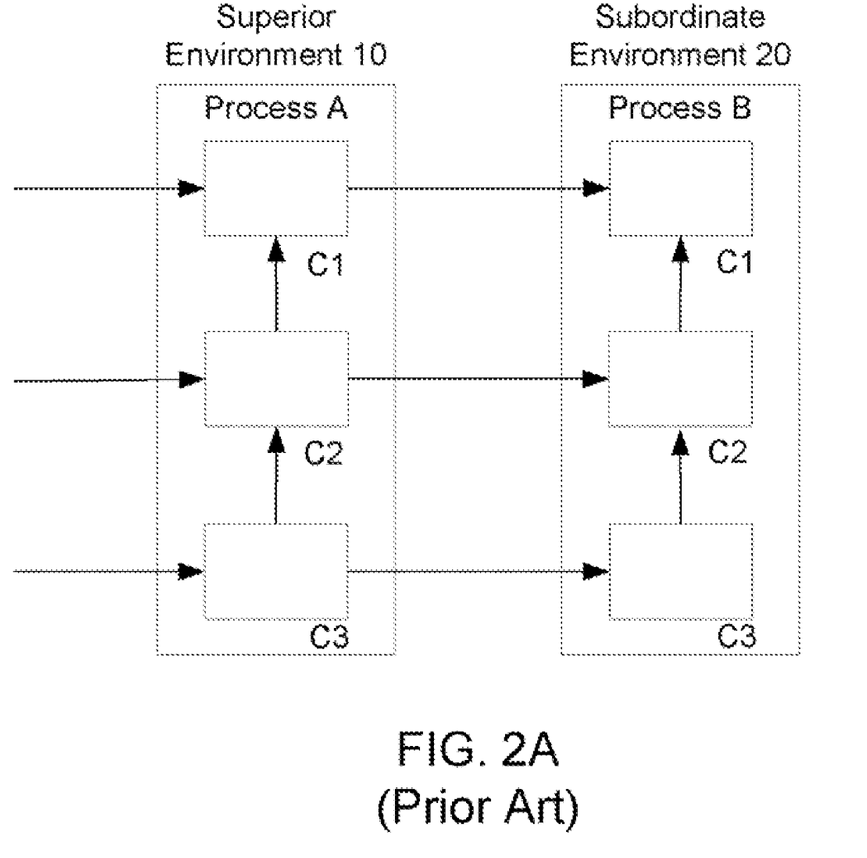
Figure 2B:
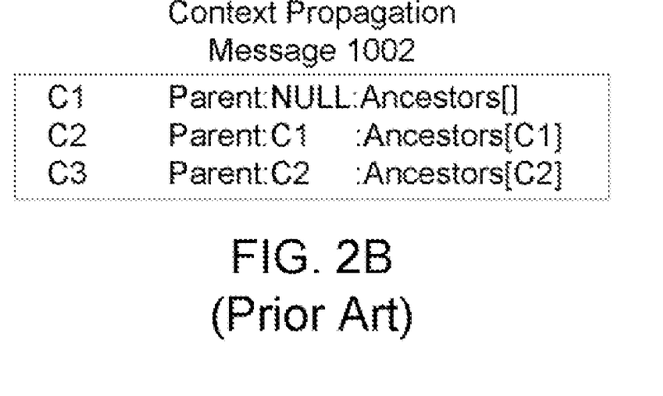

The situation becomes far more complex with nested transactions and therefore nested context information. FIGS. 2A and 2B illustrate this.

Referring first to FIG. 2A, a transaction and associated sub-transactions are initiated by an application (not shown). As before, transaction initiation causes the creation of associated context information by process A. Thus process A creates contexts C1, C2 and C3. Once again, it is necessary for some of the work to be done in a secondary or subordinate environment 20. Consequently a CPM 1002 (as shown in FIG. 2B) is sent to environment 20.

CPM 1002 includes the details of the context information being propagated. This comprises an identifier for each transaction (C1, C2, C3) and whether that transaction has a parent and/or any children. The CPM 1002 is used by process B to replicate the hierarchical information as part of process B.

Again, the superior transaction has overall control (C1). A superior transaction is responsible for determining when an instruction to complete can successfully be invoked on a particular sub-transaction (subordinate transaction). Thus C2 has responsibility for C3 and C1 has responsibility for C2. Chains of responsibility are propagated up the hierarchy both in and across superior and subordinate environments. For example, responsibility for subordinate transaction C1 in environment 20 is owned by superior transaction C1 in environment 10. Consequently superior C1 has overall control of both superior and subordinate environments. Propagation of such responsibility to a context's parent happens each time a "complete" instruction is received at that context.

FIGS. 2A and 2B depict a fully workable and known solution. However performance testing in multi-CPU machines has revealed that, even with gigabit Ethernet connections between systems, it is possible for network bandwidth to become a performance bottleneck when propagating contexts across a network. Therefore it is desirable for such contexts to be as concise as possible to minimize the likelihood of such a bottleneck occurring.

One way in which the amount of data used to propagate the contexts between systems can be reduced is to compress the data at the sending side and decompress it at the receiving side. While this reduces the burden on network bandwidth, it increases the burden on the system processors during the compression and decompression of the data. A secondary concern is that the two parties involved in the data transmission must agree on the compression/decompression algorithm to be used, adding to the complexity of the data transfer.

SUMMARY OF THE INVENTION

The invention relates to propagating contexts between a first and second system, the contexts providing information about the environments within which work in the first and second systems is to be performed. The contexts have a hierarchical structure with the lowest level context in the hierarchy being identified as a leaf context. When the first system receives a request to perform work, context information is created in the first system pertaining to the environment within which the work is to be performed. The created context information forms a context hierarchy having a root context and one or more descendant contexts. The context information is propagated from the first system to the second system, enabling re-creation at the second system of context information pertaining to the leaf context only.

BRIEF DESCRIPTION OF THE DRAWINGS

Preferred embodiments of the present invention will now be described, by way of example only, and with reference to the following drawings.

DETAILED DESCRIPTION

As mentioned above, the propagation of context information can impact system performance. One way in which such contexts can be made less verbose is to propagate only the bottom (leaf) context rather than the entire hierarchy, providing at least a 50% reduction in the amount of data taken up by the contexts.

Figure 3A:
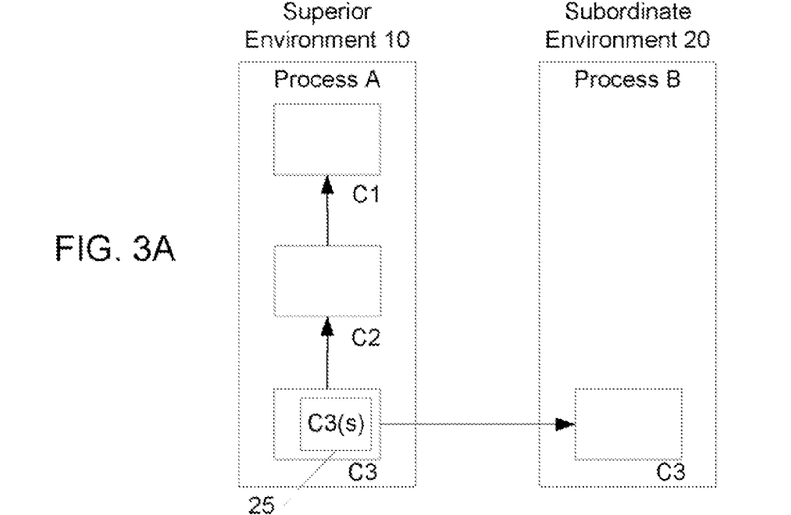
FIGS. 3A-3C illustrate problems associated with propagating only the bottom (leaf) context information in a context hierarchy.
Figure 3B:
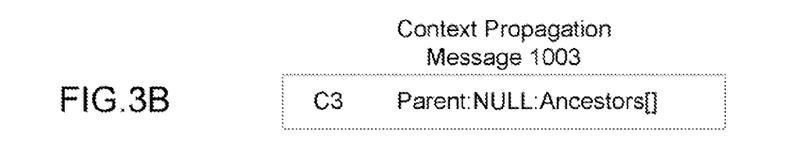
Figure 3C:
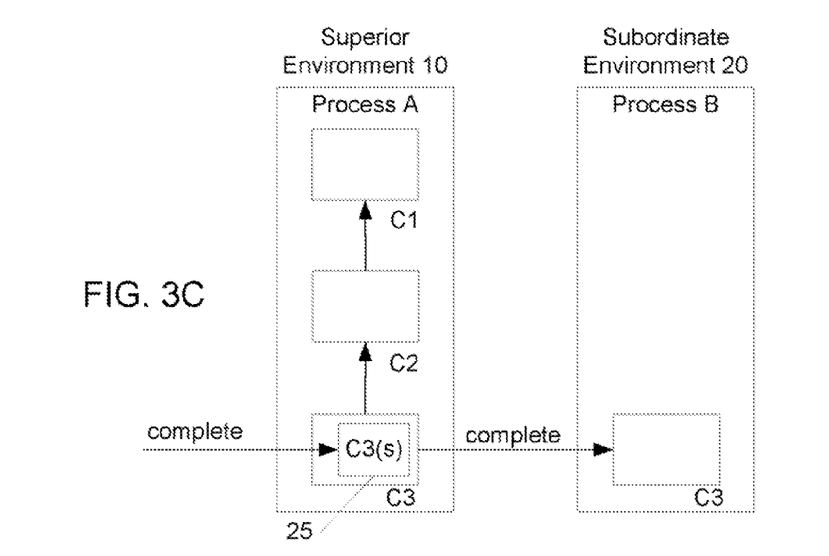

FIGS. 3A-3C illustrate the problem that occurs when a simplistic approach to propagation of the bottom context is adopted.

As shown in FIG. 3A, a context hierarchy (C1, C2, C3) exists in process A. Only the bottom context C3 is propagated to subordinate environment 20 using a context propagation message 1003 shown in FIG. 3B. Process B uses the context propagation message to instantiate C3 and a link is established between superior and subordinate C3 context information. Subordinate C3 is then registered with superior C3 (context information 25).

FIG. 3C indicates that a complete instruction is received at superior C3 from an application (not shown). When C3 in process A completes, it directs C3 in process B to complete. C3 in process B has no knowledge of its parent (since such information was not transmitted in CPM 1003) and therefore immediately directs its resource to complete. In fact, C3 should not complete until root context (superior C1) completes.

The present invention enables the transmittal of only the bottom or leaf context in a hierarchy, while overcoming the problem described above.

Figure 4A:
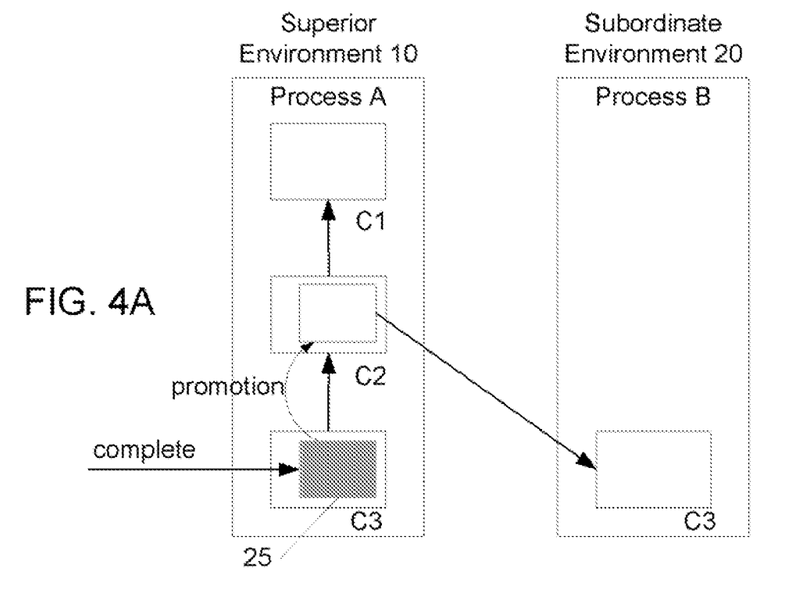
FIGS. 4A-4C disclose the operation of the present invention in accordance with a preferred embodiment.
Figure 4B:
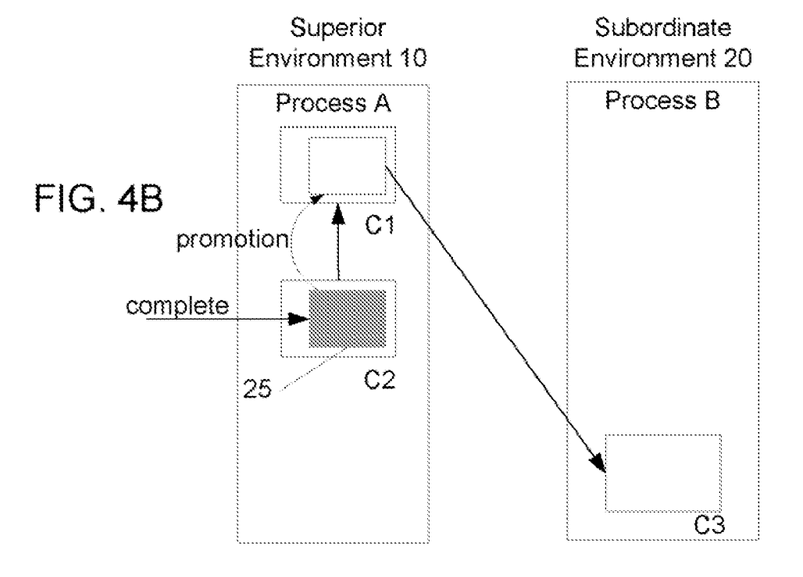
Figure 4C:
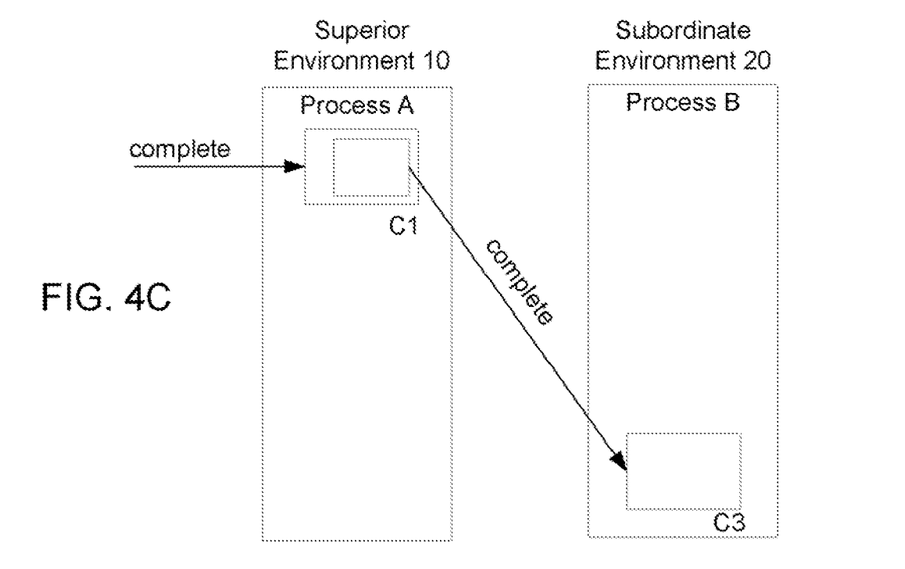
Figure 5:
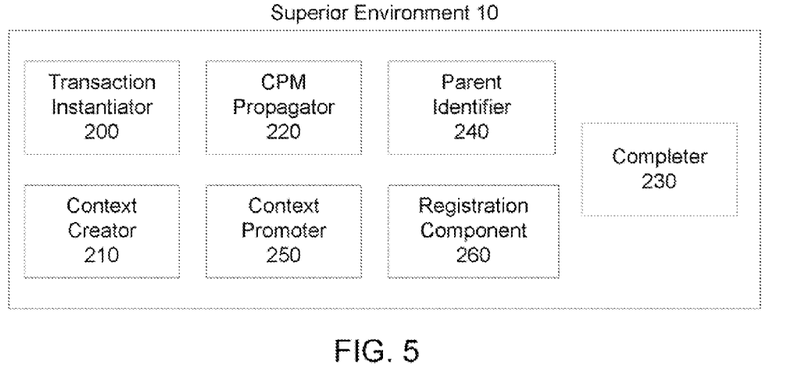
FIG. 5 illustrates the components of a system implementing a preferred embodiment of the present invention.

The solution will be discussed with reference to FIGS. 4A-4C, along with FIGS. 5 and 6, all of which should be considered in conjunction with one another. FIG. 5 illustrates the components used to achieve the preferred embodiment, while FIG. 6 shows the processing steps performed by the components.

Process A instantiates a new transaction (including several sub-transactions) for performing work (step 300 in FIG. 6) using transaction instantiator 200 shown in FIG. 5. At the same time, context information for the transaction is created using context creator 210 (step 310 in FIG. 6). Such context information C1, C2, C3 (superior environment or system 10) is shown in FIG. 4A.

Figure 6:
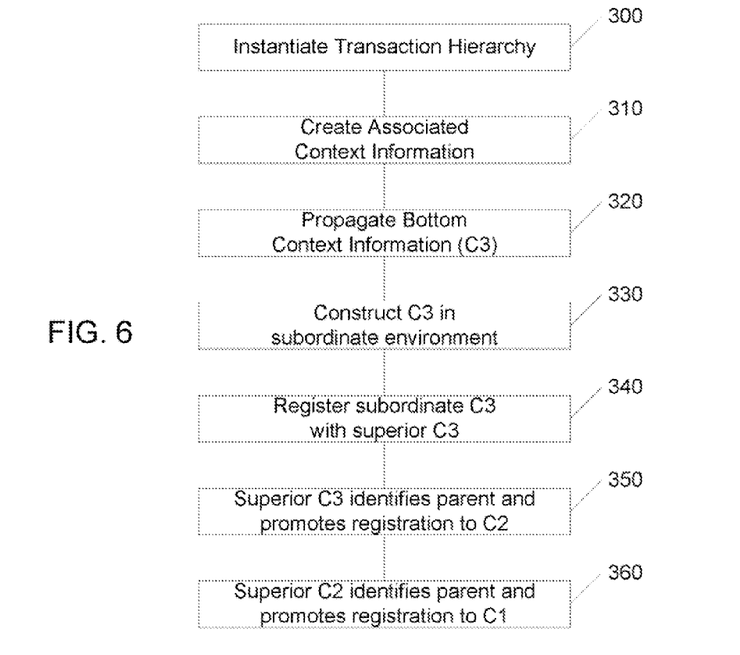
FIG. 6 is a flow chart of processing steps by the system shown in FIG. 5.

When it is determined that some of the work for the transaction needs to be performed by subordinate environment 20, CPM Propagator 220 (shown in FIG. 5) propagates the bottom context information to environment 20 (step 320 in FIG. 6).

Receipt of CPM by process B in subordinate environment 20 results in a context creator component (equivalent to that shown for process A) creating context information for C3. Again this can be seen from FIG. 4A.

Note each context hierarchy is associated with a thread running within the relevant process.

Process B requests that subordinate C3 context information be registered with the superior C3 context information (step 340 in FIG. 6). Registration component 260 (in superior environment 10 shown in FIG. 5) performs the actual registration and registers the information necessary to communicate with subordinate C3.

Once subordinate C3 is registered with superior C3, it is determined by parent identifier component 240 shown in FIG. 5 that superior C3 has a parent (C2). Consequently context promoter component 250 promotes the subordinate C3 registration up the hierarchy to C2 when a complete instruction is received at superior C3 (step 350 in FIG. 6). Here it can be seen that context information for subordinate C3 (C3(s)) 25 has been promoted from superior C3 to superior C2. Thus, when a complete instruction is received at superior C3, it does not cause superior C3 to instruct subordinate C3 to complete. Control now rests with superior C2 as indicated by the dotted arrow between superior C2 and subordinate C3.

When control is redirected to superior C2, parent identifier component 240 identifies that superior C2 also has a parent (C1). As shown in FIG. 4B, this causes CPM Propagator 220 to promote the context information for subordinate C3 to superior C2's parent C1 when a complete instruction is received at superior C2 (step 360). In FIG. 4B, superior context C3 is no longer shown (the associated sub-transaction has now completed). When superior C2 completes, the context information for that sub-transaction is removed and only context information for superior C1 remains in process A. The final stage is illustrated in FIG. 4C, which can finally instruct subordinate C3 to complete. Completion is in all cases performed by completer component 230 shown in FIG. 5.

Thus a workable solution has been disclosed which enables only the propagation of the bottom or leaf context in a context hierarchy to be propagated.

The second problem addressed herein involves loopbacks where the request flow is such that a call is made back into a process in which the hierarchy has already been seen. This will be discussed with reference to FIGS. 7A-7D.

Figure 7A:
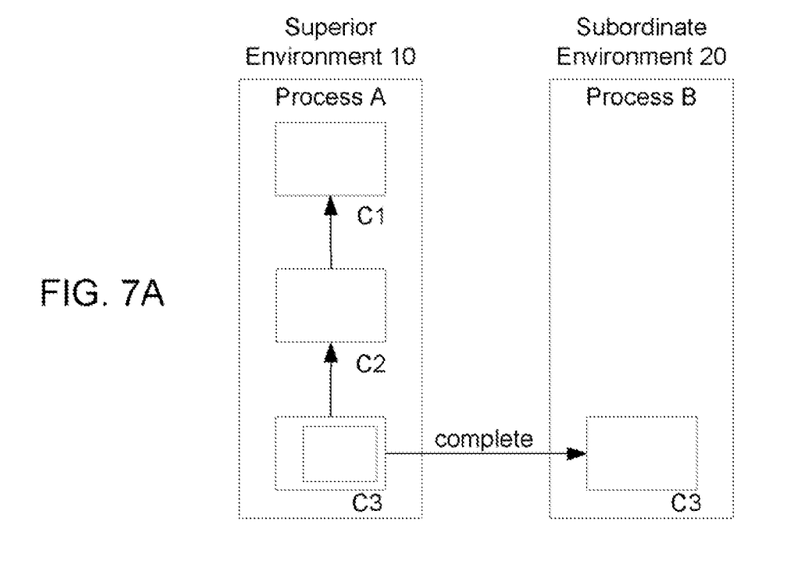
FIGS. 7A-7C illustrate a loopback problem.
Figure 7B:
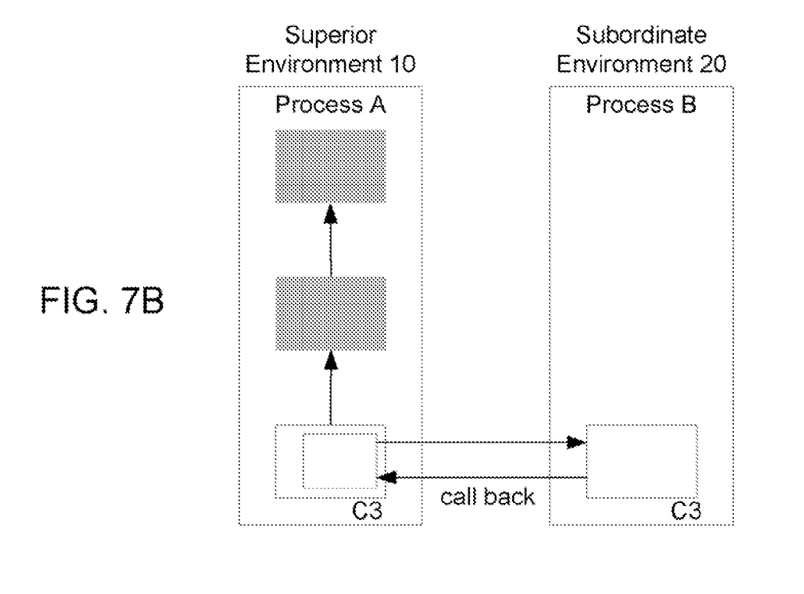
Figure 7C:
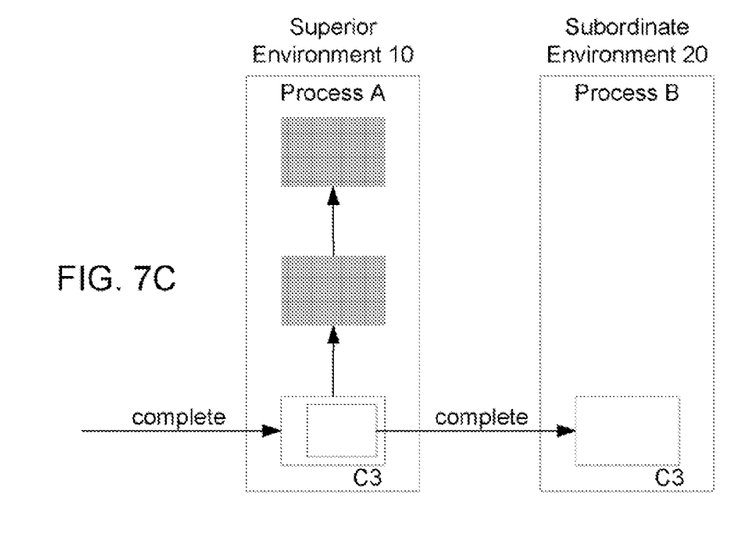

Consider process A with a hierarchy of three contexts. As before only the bottom context C3 is propagated to subordinate environment 20 and a link is established between process A and process B by which subordinate C3 is associated with superior C3. The "loopback" problem occurs when, for example, subordinate transaction C3 wants to initiate a call back to the superior environment. This is achieved by propagation of a CPM from process B to process A. The CPM includes details of only the bottom context, superior C3. Thus, as far as superior C3 is concerned, the context hierarchy in which it previously resided, no longer exists. It is only aware of itself. This is shown by greyed representations of C1 and C2 in FIG. 7B. As illustrated in FIG. 7C, this causes problems when superior C3 receives a complete instruction. Superior C3 believes that it has control and thus, when it is ready, instructs subordinate C3 to also complete. This is incorrect, since both superior C3 and subordinate C3 should actually wait until superior C1 (which does still exist), completes.

Figure 8:
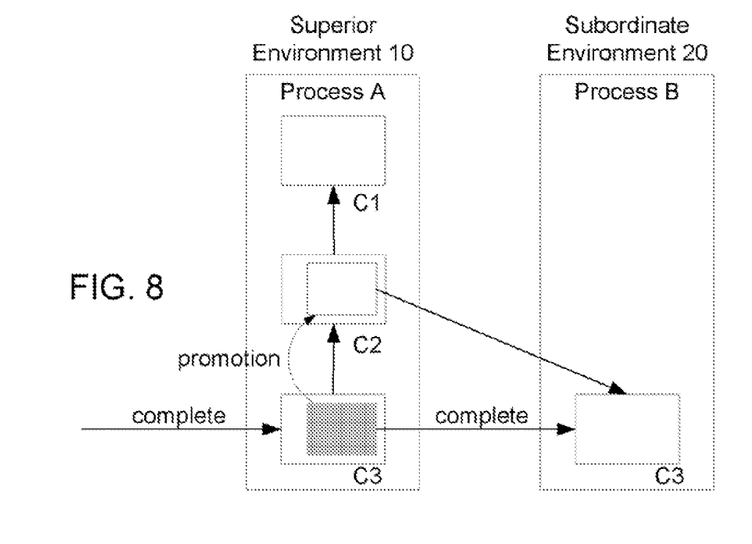
FIG. 8 illustrates the operation of a solution to the loopback problem, in accordance with a preferred embodiment of the present invention.

This problem is rectified, as shown in FIG. 8, by modifying process A to assume that, upon receipt of any context in the hierarchy, all contexts in the hierarchy about which it has knowledge (from a previous occasion) should be resumed. Thus, in this example, the superior environment is to run under the environment described by C3 and its ancestors (predecessors) about which the superior environment already has knowledge.

When the CPM is received from process B, process A determines that it already has knowledge of C3. C3 is not however associated with a processing thread (it is in suspended mode). Thus C3 needs to be associated with a thread. Superior C3 will be aware of its parent and consequently C3's parent also needs to be associated with the same thread. C3 (upon receipt of a complete instruction) will correctly promote the reference to subordinate context C3 in process B to superior parent context C2. Similarly superior C2 will be aware of its parent C1 and will have to associate C1 with the same thread. Upon receipt of a complete instruction at C2, C2 will again promote the reference. This leaves C1 with overall control over subordinate C3. The context hierarchy in process A is therefore reinstated and promotion of subordinate C3 occurs on each receipt of a complete instruction at the superior context currently referencing the subordinate C3.

Figure 9:
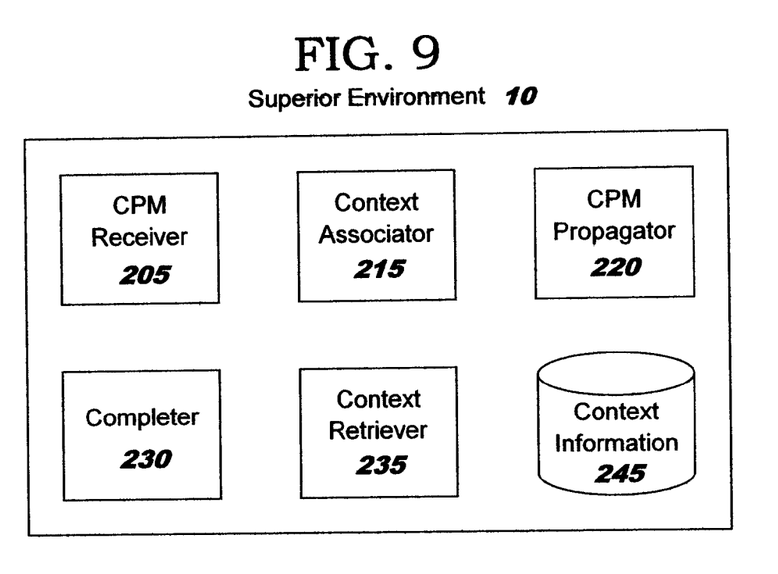
FIG. 9 illustrate components that address the loopback problem, in accordance with a preferred embodiment of the present invention.
Figure 10:
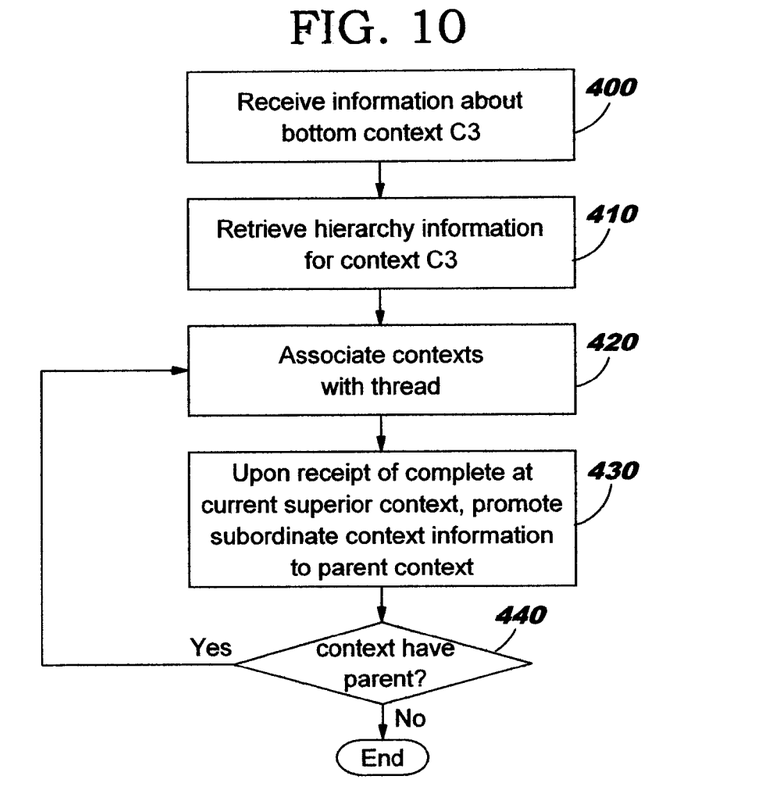
FIG. 10 is a flow chart of processing steps performed by the components shown in FIG. 9.

The components and processing that enable this is discussed with reference to FIGS. 9 and 10.

At step 400, bottom context information (e.g. C3) is received by process A via CPM receiver 205. Because this is a loop back, information about C3 and its predecessors already exists. Thus the contexts for C3's hierarchy do not need to be created. Instead such hierarchy information for the context C3 is retrieved (via Context Retriever 235) using context information 245 (step 410). Once such information has been retrieved, the retrieved contexts need to be associated with a thread (via Context Associator 215). Having restored (reinstated) C3's context hierarchy, it is now possible for superior C1 to have overall (and direct) control of subordinate context C3. There is already a coordination link between subordinate leaf context C3 and superior leaf context C3. Upon receipt of a complete instruction at the current superior context, the subordinate context information (providing the information necessary to communicate with the subordinate leaf context) is promoted to the superior's parent context (step 430). This continues (step 440) until the root or parent context has overall and direct control of subordinate C3. Thus a loopback event now works properly.

It should be appreciated that a loopback from subordinate C3 to the first system should occur while superior C3 is still active (i.e. has not completed). Thus when C3 is reinstated as a result of a loopback request, the information necessary to contact subordinate C3 (i.e. that provided via the registration link made between subordinate C3 and superior C3 at step 340) is still available for use during the loopback.

Further, when context information is propagated between a first and a second system, such context information is propagated along with a request from an application (not shown) at the first system which is controlling the work being done. The context information is associated with a thread running within process A. When an outbound request is sent to the second system, the context information in the first system is placed into "suspended" mode—i.e. is disassociated from the thread. When a reply to the application's request is received, or when a request loops back to the first system, the context information under which work is being performed or under which the loopback request is to be performed has to be reinstated and associated with a thread for performing the relevant work.

It should be appreciated that the invention is not limited to transactional context information only. Rather it is applicable to all systems between which coordinated contexts are propagated. For example, context information pertaining to compensation may be propagated between first and second systems. Such context information would contain details necessary to compensate work done in the event of a failure occurring.

Note, in the preferred embodiment, subordinate context information does not get propagated to a superior parent context if a rollback (undo) is received at the current superior context. The current superior context has the power to instruct the subordinate context at this point.

In the preferred embodiment, the superior context hierarchy has overall and direct control over the subordinate leaf context. However even in the situation where the superior context hierarchy does not have such overall and direct control, the solution still works where the superior leaf context receives a rollback (undo) request. The superior leaf context has the authority in such a situation to instruct the subordinate leaf context to rollback. The same is also true if and when control for subordinate C3 rests with superior C2. If a rollback is received at superior C2, superior C2 has the authority to instruct the subordinate leaf context to rollback.

Finally, the application mentions that complete instructions are received at contexts. This is for ease of explanation, strictly speaking a complete instruction is actually received by the relevant system and is processed by the entity that the context represents.

While preferred embodiments of the invention have been described, the scope of the invention is not to be limited to the described embodiments. The scope of the invention is defined by the following claims and includes all variations and modifications of the invention that may occur to those skilled in the art.

What is claimed is:

1. A method for propagating contexts between a first and second system, the contexts providing information about an environment within which work in the first and second systems is to be performed, the contexts having a hierarchical structure in which a lowest level context is identified as a leaf context, the method comprising:
  receiving, at the first system, a request to perform work;
  creating a context hierarchy in the first system, responsive to determining that performing the work involves a parent and at least one descendant executing at the first system, wherein:
    the context hierarchy provides information about the environment within which the work is to be performed in the first system; and
    the context hierarchy represents the parent as a root context and represents each descendant as a descendant context, the root context providing context information about the environment in which the parent will execute and each descendant context providing context information about the environment in which the descendant it represents will execute; and
  responsive to determining, at the first system, that a leaf descendant will request the second system to perform a portion of the work, propagating from the first system to the second system the leaf context representing the leaf descendant, wherein the leaf context representing the leaf descendant enables re-creation at the second system of the context information about the leaf descendant only.

2. The method of claim 1, wherein, following the re-creation at the second system of the context information about the leaf descendant, the context hierarchy in the first system retains direct control over the leaf context in the second system.

3. The method of claim 1, further comprising:
registering, at the first system responsive to receiving a request from the second system, the second system's leaf context with the first system's leaf context for coordination between the work performed at the first system and the portion of the work performed at the second system, the registration containing information necessary to communicate with the second system's leaf context.

4. The method of claim 1, further comprising:
responsive to receiving a complete instruction at the leaf context in the first system, promoting, up the context hierarchy to an immediate ancestor of the leaf context in the first system, responsibility for directing the leaf context in the second system to complete.

5. The method of claim 4, wherein a decision as to whether to instruct the second system's leaf context to complete is deferred to the parent executing in the first system by recursively promoting the responsibility up the context hierarchy.

6. The method of claim 5 further comprising:
receiving, at the first system, a request from the second system's leaf context to perform work at the first system under the first system's leaf context;
reinstating the first system's leaf context such that it is associated with a processing thread; and
reinstating the context for each ancestor of the leaf context in the first system, wherein:
each reinstated context is associated with the processing thread; and
following the reinstating, the context hierarchy in the first system regains direct control over the leaf context in the second system.

7. Apparatus for propagating contexts between a first and second system, the contexts providing information about an environment under which work in the first and second system is to be performed, the contexts having a hierarchical structure in which a lowest level context is identified as a leaf context, the apparatus comprising:
a computer system; and
software installed on and executed on the computer system to perform:
receiving, at the first system, a request to perform work;
creating a context hierarchy in the first system, responsive to determining that performing the work involves a parent and at least one descendant executing at the first system, wherein:
the context hierarchy provides information about the environment within which the work is to be performed in the first system; and
the context hierarchy represents the parent as a root context and represents each descendant as a descendant context, the root context providing context information about the environment in which the parent will execute and each descendant context providing context information about the environment in which the descendant it represents will execute; and
responsive to determining, at the first system, that a leaf descendant will request the second system to perform a portion of the work, propagating from the first system to the second system the leaf context representing the leaf descendant, wherein the leaf context representing the leaf descendant enables re-creation at the second system of the context information about the leaf descendant only.

8. The apparatus of claim 7, wherein, following the re-creation at the second system of the context information about the leaf descendant, the context hierarchy in the first system retains direct control over the leaf context in the second system.

9. The apparatus of claim 8, wherein the software further performs:
registering, at the first system responsive to receiving a request from the second system, the second system's leaf context with the first system's leaf context for coordination between the work performed at the first system and the portion of the work performed at the second system, the registration containing information necessary to communicate with the second system's leaf context.

10. The apparatus of claim 7, wherein the software further performs:
responsive to receiving a complete instruction at the leaf context in the first system, promoting, up the context hierarchy to an immediate ancestor of the leaf context in the first system, responsibility for directing the leaf context in the second system to complete.

11. The apparatus of claim 10, wherein a decision as to whether to instruct the second system's leaf context to complete is deferred to the parent executing in the first system by recursively promoting the responsibility up the context hierarchy.

12. The apparatus of claim 11 further comprising:
receiving, at the first system, a request from the second system's leaf context to perform work at the first system under the first system's leaf context;
reinstating the first system's leaf context such that it is associated with a processing thread; and
reinstating the context for each ancestor of the leaf context in the first system, wherein:
each reinstated context is associated with the processing thread; and
following the reinstating, the context hierarchy in the first system regains direct control over the leaf context in the second system.

13. A computer program product comprising computer usable media embodying program instructions that, when loaded into and executed by a computer, cause the computer to propagate contexts between a first and second system, the contexts providing information about an environment within which work in the first and second systems is to be performed, the contexts having a hierarchical structure in which a lowest level context is identified as a leaf context, comprising:
receiving, at the first system, a request to perform work;
creating a context hierarchy in the first system, responsive to determining that performing the work involves a parent and at least one descendant executing at the first system, wherein:
the context hierarchy provides information about the environment within which the work is to be performed in the first system; and
the context hierarchy represents the parent as a root context and represents each descendant as a descendant context, the root context providing context information about the environment in which the parent will execute and each descendant context providing context information about the environment in which the descendant it represents will execute; and responsive to determining, at the first system, that a leaf descendant will request the second system to perform a portion of the work, propagating from the first system to the second system the leaf context representing the leaf descendant, wherein the leaf context representing the leaf descendant enables re-creation at the second system of the context information about the leaf descendant only.

14. The computer program product of claim 13, wherein, following the re-creation at the second system of the context information about the leaf descendant, the context hierarchy in the first system retains direct control over the leaf context in the second system.

15. The computer program product of claim 13, further comprising:

registering, at the first system responsive to receiving a request from the second system, the second system's leaf context with the first system's leaf context for coordination between the work performed at the first system and the portion of the work performed at the second system, the registration containing information necessary to communicate with the second system's leaf context.

16. The computer program product of claim 13, further comprising:

responsive to receiving a complete instruction at the leaf context in the first system, promoting, up the context hierarchy to an immediate ancestor of the leaf context in the first system, responsibility for directing the leaf context in the second system to complete.

17. The computer program product of claim 16, wherein a decision as to whether to instruct the second system's leaf context to complete is deferred to the parent executing in the first system by recursively promoting the responsibility up the context hierarchy.

18. The computer program product of claim 17, further comprising:

receiving, at the first system, a request from the second system's leaf context to perform work at the first system under the first system's leaf context;

reinstating the first system's leaf context such that it is associated with a processing thread; and reinstating the context for each ancestor of the leaf context in the first system, wherein:

each reinstated context is associated with the processing thread; and following the reinstating, the context hierarchy in the first system regains direct control over the leaf context in the second system.

19. The method of claim 1, wherein the propagating further comprises sending, from the first system to the second system, a request to perform the portion of the work at the second system.

20. The method of claim 4, wherein a request received at the leaf context in the first system to rollback is not deferred to the parent executing in the first system by recursively promoting the responsibility up the context hierarchy, and instead is sent directly from the leaf context in the first system to the leaf context in the second system.

* * * * *